(12) United States Patent
Bish et al.

(10) Patent No.: US 7,062,644 B2
(45) Date of Patent: Jun. 13, 2006

(54) METHOD, SYSTEM, AND PROGRAM FOR INITIALIZING A STORAGE DEVICE COMPRISING MULTIPLE STORAGE UNITS THROUGH A STORAGE CONTROLLER

(75) Inventors: John Edward Bish, Tucson, AZ (US); David Alan Burton, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 09/870,291

(22) Filed: May 30, 2001

(65) Prior Publication Data

US 2002/0184481 A1    Dec. 5, 2002

(51) Int. Cl.
    *G06F 15/177*    (2006.01)

(52) U.S. Cl. .................... 713/1; 713/100; 711/114
(58) Field of Classification Search ................ 713/1, 713/2, 100; 711/111, 114
    See application file for complete search history.

(56) References Cited

U.S. PATENT DOCUMENTS

| | | | |
|---|---|---|---|
| 5,375,128 A | 12/1994 | Menon et al. | |
| 5,657,468 A | 8/1997 | Stallmo et al. | |
| 5,682,499 A | * 10/1997 | Bakke et al. | 711/112 |
| 5,758,187 A | 5/1998 | Young | |
| 5,774,641 A | 6/1998 | Islam et al. | |
| 5,875,456 A | 2/1999 | Stallmo et al. | |
| 5,909,691 A | * 6/1999 | Schultz et al. | 711/4 |
| 5,978,856 A | 11/1999 | Jones | |
| 6,105,076 A | 8/2000 | Beardsley et al. | |
| 6,282,671 B1 | 8/2001 | Islam et al. | |
| 6,665,743 B1 | * 12/2003 | Benhase et al. | 710/10 |
| 6,691,209 B1 | * 2/2004 | O'Connell | 711/114 |
| 6,779,062 B1 | * 8/2004 | Eschmann et al. | 710/74 |

FOREIGN PATENT DOCUMENTS

JP    07-248884    9/1995

OTHER PUBLICATIONS

Australian Patent Office Search Report mailed Jun. 24, 2004, Application No. SG 200202961-9, filed May 16, 2002.
Australian Patent Office Written Opinion mailed Jun. 24, 2004, Application No. SG 200202961-9, filed May 16, 2002.

* cited by examiner

*Primary Examiner*—Dennis M. Butler
(74) *Attorney, Agent, or Firm*—David W. Victor; Konrad Raynes & Victor LLP

(57) ABSTRACT

Provided is a method, system, and program for initializing a storage device comprising multiple storage units through a storage controller. A request is received to initialize a storage space that spans the storage units. A determination is made of a layout of sets of sequential data blocks of the storage space on the storage units, wherein sets of sequential data blocks are written across the storage units. For each set of sequential data blocks, a determination is made of a block address in each storage unit where a first data block in the set of sequential data blocks will be written. A write command is generated for each of the storage units, wherein each write command indicates the determined block address for the storage unit and a block number. The write command is transmitted with one block of initialization data to the storage unit. The storage unit receiving the write command writes the block of initialization data from the indicated block address and writes the block of initialization data to each subsequent consecutive block in the storage unit a number of times equal to the block number.

51 Claims, 4 Drawing Sheets

METHOD, SYSTEM, AND PROGRAM FOR INITIALIZING A STORAGE DEVICE COMPRISING MULTIPLE STORAGE UNITS THROUGH A STORAGE CONTROLLER

BACKGROUND OF THE INVENTION

1. Field of the Invention

The present invention relates to a system, method, and program for initializing a storage device comprising multiple storage units through a storage controller.

2. Description of the Related Art

High end storage controllers manage Input/Output (I/O) requests from networked hosts to one or more storage devices, such as a direct access storage device (DASD), Redundant Array of Independent Disks (RAID Array), and Just a Bunch of Disks (JBOD). Storage controllers include one or more host bus adaptor (HBA) cards to communicate with one or more hosts over a network and adaptors to communicate with the storage devices.

Before the disks managed by a storage controller can be used, they must be initialized. For instance, to initialize a 524 byte sector, the storage controller would write zero data to an eight byte header at the beginning of the sector, followed by 512 bytes of zero data, followed by a two byte sequence number of the logical sector number and a two byte longitudinal redundancy code (LRC) code seeded with the physical sector number or the logical block address (LBA). This process of initializing each sector with zero data and the two byte LRC code with the seeded LBA can take up to several hours. Most prior art devices initialize disks in an array, such as a RAID array, by performing a "full stripe" write, where the storage controller writes an entire stripe of data and parity to each disk in the stripe using one write command for each sector to initialize the data in each sector of the stripe.

Many storage controllers may have to initialize numerous attached hard disk drives. For instance, in certain Fibre Channel implementations, a storage controller may connect up to 126 or so hard disk drives on a Fibre Channel Arbitrated Loop. One factor that adversely affects the initialization performance in such large arrays is the disparity in the transfer rates on the loop between the devices and the internal data transfer rate in the hard disk drives. Arbitrated loop technology supports a transfer rate of 200 megabytes per second (MB/s) and disk drives can transfer data internally at a rate of up to 15 MB/s. Such a ratio means that the storage controller can only write initialization data to seven attached disk drives before maximizing the loop throughput. Thus, the throughput of the connection between the storage controller and disk drives is a bottleneck that can substantially affect the performance of initialization in systems when there are more than 10 disk drives. In fact, in an eighty disk drive system with 2.8 terabytes of data, the initialization process can take up to ten hours to complete.

For these reasons, there is a need in the art to provide improved techniques for initializing data in a disk array.

SUMMARY OF THE PREFERRED EMBODIMENTS

Provided is a method, system, and program for initializing a storage device comprising multiple storage units through a storage controller. A request is received to initialize a storage space that spans the storage units. A determination is made of a layout of sets of sequential data blocks of the storage space on the storage units, wherein sets of sequential data blocks are written across the storage units. For each set of sequential data blocks, a determination is made of a block address in each storage unit where a first data block in the set of sequential data blocks will be written. A write command is generated for each of the storage units, wherein each write command indicates the determined block address for the storage unit and a block number. The write command is transmitted with one block of initialization data to the storage unit. The storage unit receiving the write command writes the block of initialization data from the indicated block address and writes the block of initialization data to each subsequent consecutive block in the storage unit a number of times equal to the block number.

In further implementations, the determined layout includes multiple sets of sequential data blocks written to each storage unit, wherein the multiple sets are written to non-consecutive block addresses in one storage unit.

In certain implementations, the storage units comprise hard disk drives within a disk array. In such case, the sets of sequential data blocks comprise portions of a stripe of data written across the storage units, wherein multiple stripes are written across the storage units.

Further provided is a method, system, and program for initializing a storage unit that comprises one of multiple storage units managed by a storage controller. A write command is received with one block of initialization data from the storage controller to initialize a set of sequential blocks in a storage space. The write command indicates a block address in the storage unit where a first data block in the set of sequential data blocks will be written and a block number. The block of initialization data transmitted with the write command is written to the indicated block address. Further, the block of initialization data is written to each subsequent consecutive block in the storage unit following the indicated block address a number of times equal to the block number.

The described implementations provide a technique for initializing a storage space by using a single write command to initialize multiple blocks of data in the storage units of a storage array in a manner that reduces the use of the channel bandwidth between a storage controller and the storage units in the array being initialized.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
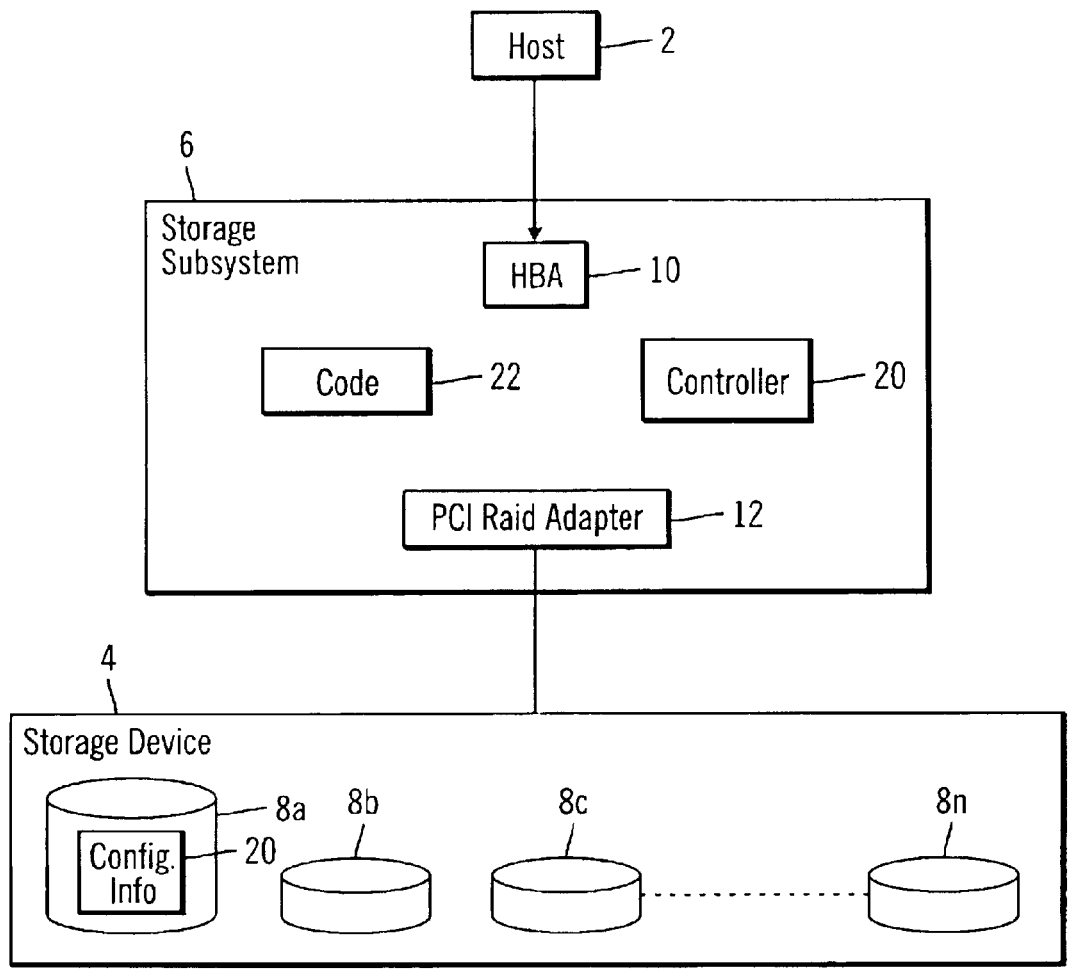
FIG. 1 illustrates a computing environment in which aspects of the invention are implemented.

FIG. 1 illustrates a computing environment in which aspects of the invention are implemented. A host system 2 transmits Input/Output (I/O) requests to a storage device 4 through a storage subsystem 6 which manages access to the storage device 4. The storage device 4 comprises an array of hard disk drives 8a, b, c . . . n in accordance with RAID array storage devices known in the art. The storage device 4 may comprise any number of hard disk drives 8a, b, c . . . n, including fifty or more. The storage subsystem 6 includes a host bus adaptor (HBA) 10 to enable communication with the host 2 and a Peripheral Component Interconnect (PCI) RAID adaptor 12 to allow access to the disk drives 8a, b, c . . . n in the storage device 4. The storage subsystem 6 further includes a controller 20 to execute code 22 in a non-volatile storage unit (not shown), e.g., ROM, PROM, EEPROM, etc., to perform storage subsystem operations in a manner known in the art. Further, the PCI RAID adaptor 12 may be capable of configuring and initializing the disk drives 8a, b, c . . . n as RAID devices and striping data to the disk drives 8a, b, c . . . n in a manner known in the art.

Figure 2:
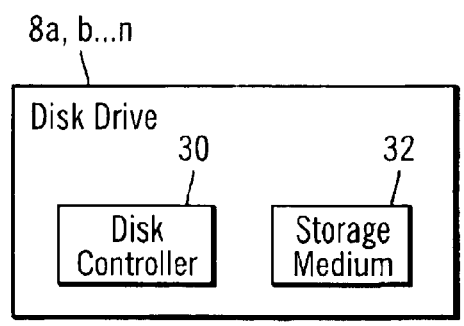
FIG. 2 illustrates components within a disk drive used with implementations of the invention.

FIG. 2 illustrates the components within each disk drive 8a, b, c . . . n as including a disk controller 20 and a storage medium 32. In disk drive implementations, the storage medium 32 would comprise the magnetic surfaces of one or more disks. The disk controller 20 would implement logic to manage Input/Output operations with respect to the storage medium 32 in a manner known in the art and additionally include logic to perform the initialization operations described herein. The disk controller 20 may comprise a processor executing code in a non-volatile memory, such as a PROM, EEPROM, ROM, etc., or comprise an integrated circuit, such as an Application Specific Integrated Circuit (ASIC) or other logic device.

In the described implementations, the storage subsystem 6 performs the initialization and preempts the PCI RAID adaptor 12 from writing initialization data to the disk drives 8a, b, c . . . n as described in the co-pending and commonly assigned patent application entitled "Method, System, and Program for Initializing a Storage Space", having U.S. application Ser. No. 09/838,049 and filed on Apr. 18, 2001, which application is incorporated herein by reference in its entirety. However, in alternative implementations, the PCI RAID adaptor 12 may perform the initialization operations described herein.

Figure 3:
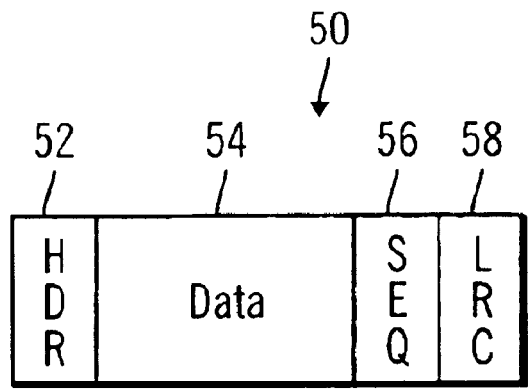
FIG. 3 illustrates the format of a sector in a manner known in the prior art.

FIG. 3 illustrates the format of a sector in accordance with certain implementations. In certain implementations, sector 50 is 524 bytes and includes eight bytes of a header field 52, 512 bytes of user data 54, a two byte sequence number, 56 and a 2 byte LRC field 58. In certain implementations, the sectors may have a different number of total bytes, e.g., 512, 516, etc. Further, the sectors may not include the header 52, sequence number 56 and/or LRC value 58.

In RAID array implementations, the controller 20 would initialize the array by striping initialization data across the disks 8a, b, c . . . n. The controller 20 would write data to one disk for a number of sectors equal to the sector depth before switching to the next disk to write the next depth of sectors. Thus, a stripe has a length equal to the number of disks in the array and a width equal to the sector depth on which data is written before switching to the next disk in the stripe. Each stripe includes a parity sector.

In the described implementations, the controller 20 utilizes a single write increment command transferred with a single block of initialization data for the sector, e.g., 512 or 524 bytes, to cause each disk 8a, b, c . . . n in the array to write initialization data to all the sectors in the stripe. The initialization data would comprise all zero data for the sector. In this way, through a single transmission of approximately the size of the sector and the size of the command, which is only 16 or so bytes, numerous sectors on the receiving disk are initialized This single write increment command is thus able to cause the initialization of multiple sectors that would previously require multiple write commands for each sector to initialize.

Figure 4:
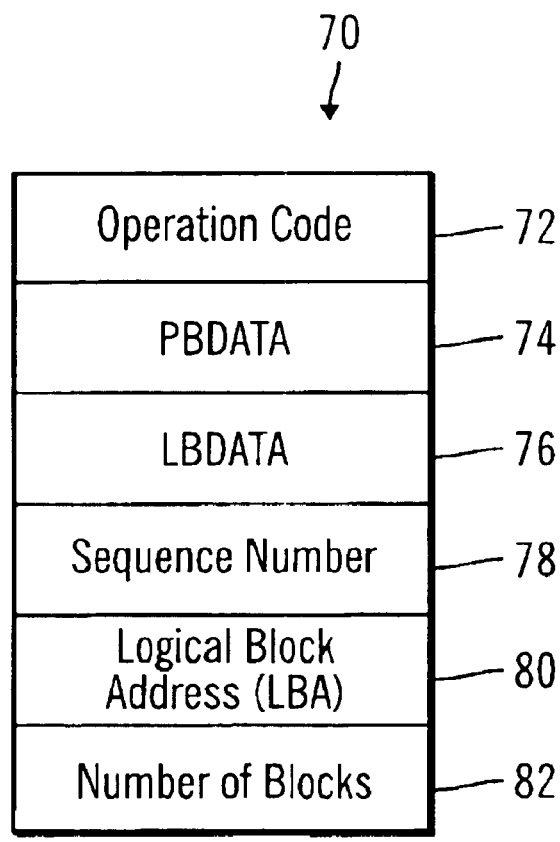
FIG. 4 illustrates a format of a write implement command in accordance with implementations of the invention.

FIG. 4 illustrates a format of the fields in a write increment command 70 in accordance with implementations of the invention. The write increment command 70 may be implemented as a Small Computer System Interface (SCSI) command. The write increment command includes:

Operation Code 72: provides the unique operation code used to specify the write increment command.

PBDATA 74: when this field is zero, then the disk drives 8a, b, c . . . n will ignore the sequence number. For instance, in a Fixed Block Architecture (FBA), as opposed to a Count-Key-Data (CKD) architecture, the sequence number may not be used. Otherwise, if His field is non-zero, then the sequence number will be included in the sector during initialization.

LBDATA 76: when this field is zero, then the disk drives 8a, b, c . . . n will not write a Longitudinal Redundancy Check (LRC) error correction code to the sector. Otherwise, if this field is non-zero, then the LRC code will be written.

Sequence number 78 comprises the starting sequence number to use.

Logical Block Address (LBA) 80: comprises the starting LBA in the disk 8a, b, c . . . n from where the data will be written.

Number of Blocks 82: Number of sectors initialized by the disk in response to write increment command 70.

Figure 5:
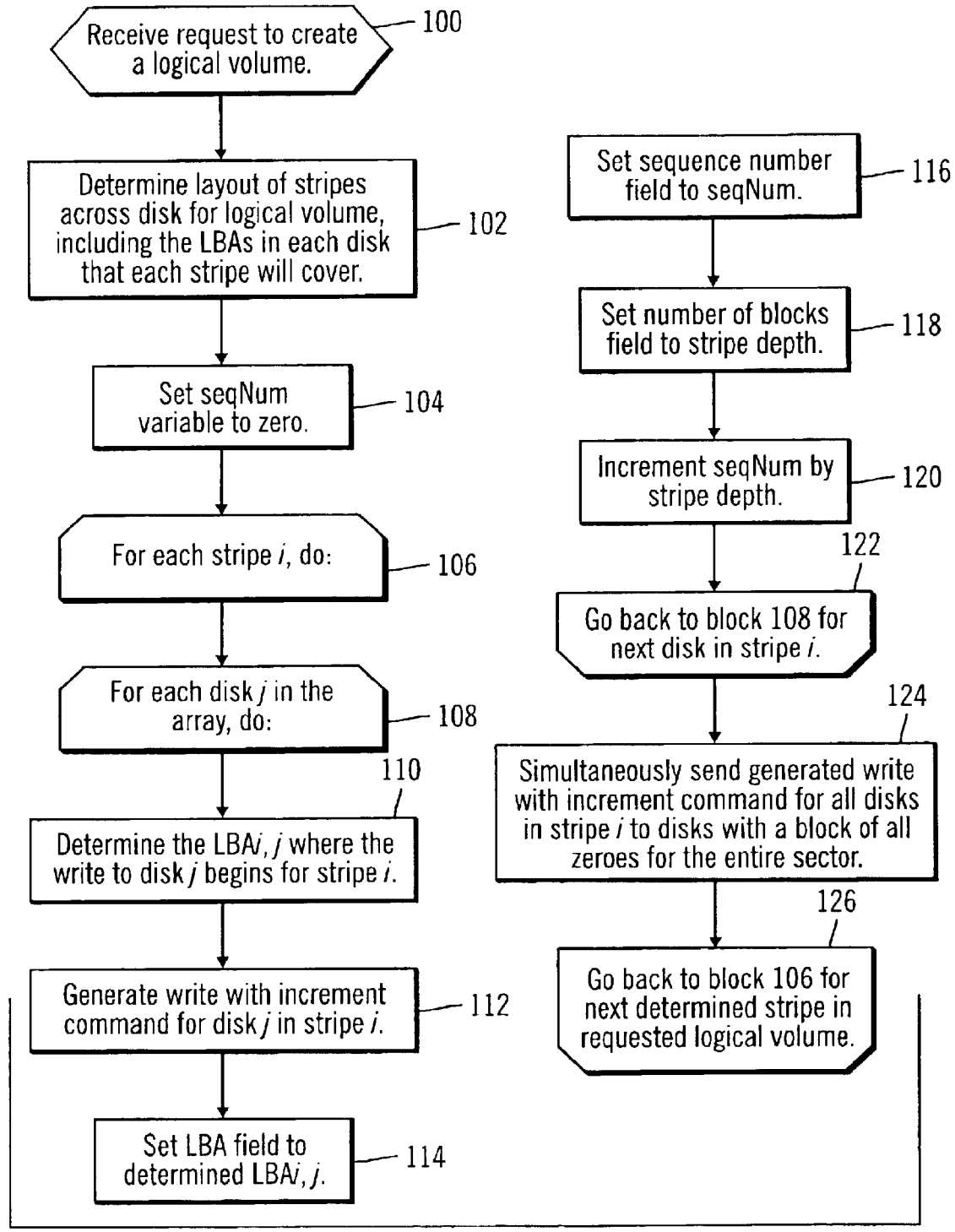
FIG. 5 illustrates logic implemented in a storage subsystem to initialize data in an array of storage devices in accordance with implementations of the invention.

FIG. 5 illustrates logic implemented in the code 22 executed by the controller 20 to initialize a logical volume in an array of disk drives 8a, b, c . . . n, which in certain implementations comprises a RAID array. Control begins at block 100 with the controller 20 receiving a request to create a logical volume. The controller 20 would then determine (at block 102) the layout of the logical volume across the disks 8a, b, c . . . n in the RAID array. The controller 20 would determine how the sectors of the logical volume are striped across the sectors in the disk drives 8a, b, c . . . n in a manner known in the art. For instance, in RAID array implementations, the controller 20 would stripe data across the disks 8a, b, c . . . n by writing data to one disk for a number of sectors equal to the sector depth before switching to the next disk to write the next depth of sectors. Thus, a stripe has a length equal to the number of disks in the array and a width equal to the sector depth on which data is written before switching to the next disk in the stripe. The sequence number (seqNum) is initialized (at block 104) to zero.

For each stripe i determined at block 102, the controller 20 begins a loop at block 106 through blocks 126. For each stripe i, the controller 20 further performs a loop at block 108 through 122 for each disk drive j in the storage device 4 array to which the data will be striped. At block 110, the controller 20 determines the logical block address of the first sector on drive j in stripe i ($LBA_{i,j}$) from the previously determined layout. The controller 20 generates (at block 112) a write increment command 70 to initialize the data for stripe i in disk j. The LBA field 80 is set (at block 114) to the determined LBA$_{i,j}$ and the sequence number field 78 is set (at block 116) to the sequence number variable (seqNum), which indicates the first sector number of stripe i in disk j. The number of blocks field 82 is set (at block 118) to the stripe depth, indicating the number of sectors initialized within disk j in response to the write increment command 70. The sequence number variable (seqNum) is then incremented (at block 120) by the stripe depth, which is the number of blocks that will be initialized in disk j in response to the current write increment command 70 being generated. Control then proceeds (at block 122) back to block 108 to write data from stripe i to the next disk 8a, b, c . . . . n in the array.

In certain implementations, after generating write increment commands for all the disks 8a, b, c . . . n in stripe i, the controller 20 transmits (at block 124) all the generated write commands to the disk drives 8a, b, c . . . . . n over the connection to simultaneously initialize the data for stripe i across all the disks 8a, b, c . . . n in the array. In certain implementations each write increment command 70 is transmitted with a block of all zero data for the sector. Control then proceeds (at block 126) back to block 106 to generate write increment commands 70 to initialize the data for the next stripe. Alternatively, the controller 20 may send the write increment command 70 immediately after generating the command at block 118, or after generating write increment commands 70 for multiple stripes.

Figure 6:
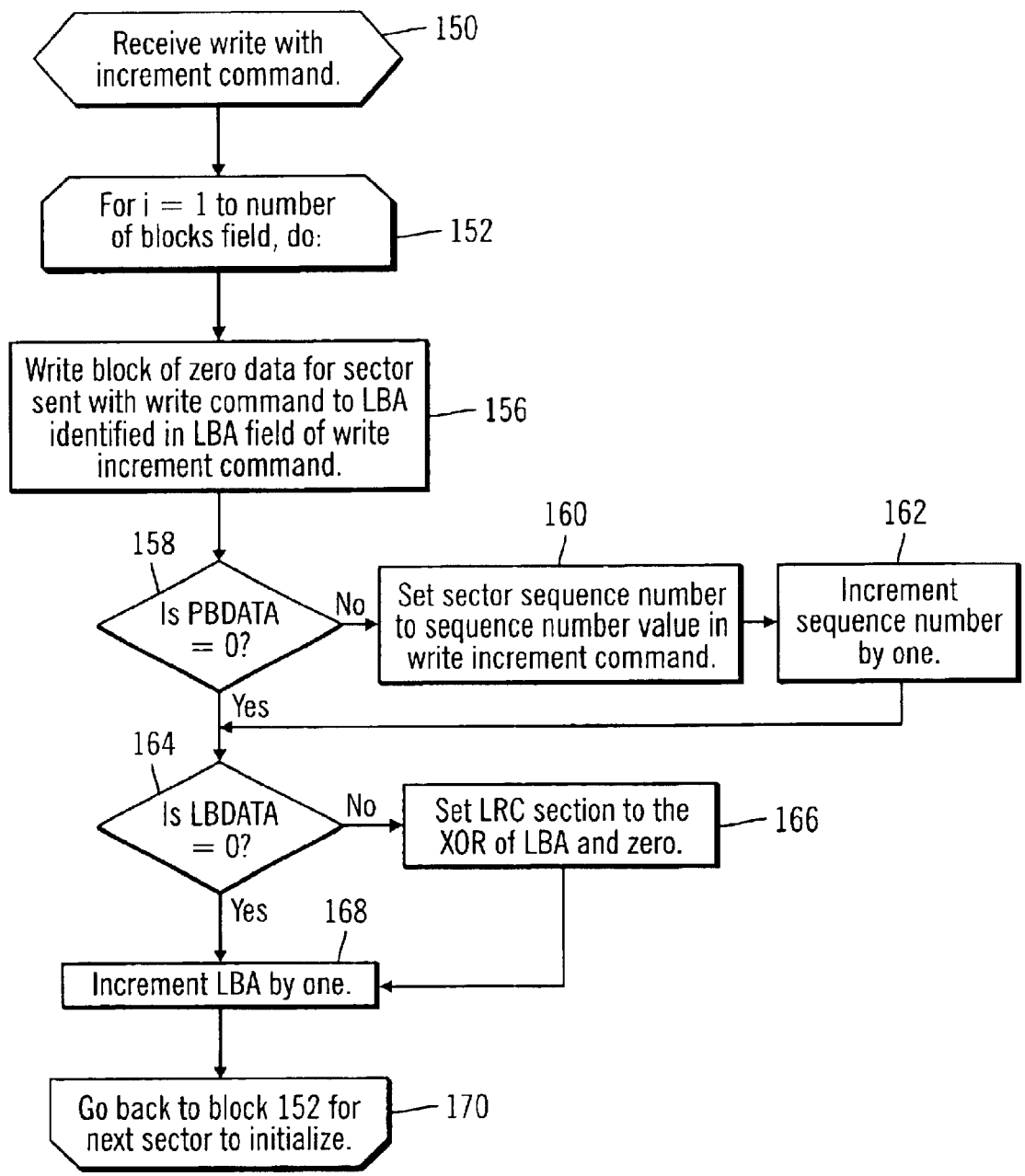
FIG. 6 illustrates logic implemented in a disk drive to initialize data in accordance with implementations of the invention.

FIG. 6 illustrates logic implemented in the disk controller 20 to initialize the storage medium 32 in response to receiving (at block 150) one of the write increment commands 70 transmitted at block 124 in FIG. 5. The disk controller 20 performs a loop at blocks 152 through 170 for a number of blocks equal to the number of blocks field 72, which in certain implementations is the stripe depth. The disk controller 30 then writes (at block 156) all the data from the block transmitted with the write increment command 70, which in the described implementations comprises a full sector of all zero data, to the sector having the LBA indicated in the LBA field 80. If (at block 158) the PBDATA field 74 is non-zero, then the disk controller 20 sets (at block 160) the sector sequence number 56 (FIG. 2) to the value in the sequence number field 78 (FIG. 3) of the received write increment command 70. The sequence number 78 in the write increment command 70 is then incremented (at block 162) by one to use in the initialization of the next sector.

Otherwise if (at block 158) the PBDATA field 54 is zero or from block 162, the controller 20 determines (at block 164) whether the LBDATA field 76 is zero. If not, then the controller 20 sets (at block 166) the sector LRC bytes 58 (FIG. 2) to the value of zero XOR'd with the LBA value. In this way, the LRC field 58 of the sector is seeded with the LBA of the sector. Because the initialization data is all zeroes, the result of XORing all the bits in the non-LRC portion of the sector 50 would result in zero. If (at block 164) the LBDATA field 54 is zero or from block 166, the controller 20 increments (at block 168) the LBA field 60 in the received write increment command 70 by one for use in writing the initialization data to the next sector of disk j for stripe i. In this way, the disk controller uses the write command 70 fields as variables for the LBA and sequence number data used to initialize subsequent sectors. After completing the initialization of the current sector, control proceeds (at block 170) back to block 152 for the next sector to be initialized until a number of sectors are initialized that equals the number of blocks field 82.

With the logic of FIGS. 5 and 6, the controller 20 is able to initialize data on the disks 8a, b, c . . . n without having to transmit the zero sector data to each disk drive 8a, b, c . . . n for each sector being initialized. Instead, the controller 20 transmits only one write command with one block of zero data for each disk in each stripe, thereby significantly reducing the number of write commands and bytes of data transmitted across the line to the disk drives 8a, b, c . . . . n. Because the write increment commands of the described implementations use significantly less bandwidth than prior art initialization schemes, the controller 20 is able to send write increment commands to all the disks 8a, b, c . . . n simultaneously. The described implementations remove the connection bottleneck between the storage subsystem 6 and storage device 4. In this way, initialization is limited only by the transfer capacity within the storage devices 8a, b, c . . . n. It has been observed that in systems where there are 80 disk drives connected to a storage controller on a Fibre Channel Arbitrated Loop, initialization using the write increment command 70 of the described implementations can take forty minutes, which is substantially less than the several hours required to initialize this many disk drives using prior art initialization techniques.

Additional Implementation Details

The described implementations of the invention may be realized as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), complex programmable logic device (CPLD), etc.), complex programmable logic device (CPLD) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMS, RAMS, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic of FIGS. 5 and 6 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

In the described implementations, data was initialized in sectors. In alternative implementations, blocks of data in formats other than sectors may be initialized using the write increment command that initializes multiple blocks with the transmission of data for only one block.

In the described implementations, the controller 20 generated the write increment command to initialize a RAID storage device. Additionally, the above described write increment command and logic can be used to configure non-RAID storage devices. In such case, the controller 20 would have to determine the layout of the data one the one or more disk drives and generate write commands for sequential blocks of data written to each device.

The adaptor which the storage subsystem 6 controlled comprised a PCI RAID adaptor. However, the storage subsystem initialization technique described herein can also be utilized with other types of storage adaptors, e.g., Small Computer System Interface (SCS), Fibre Channel, etc., adaptors.

In the described implementations, the PCI RAID adaptor is used in a storage subsystem. Additionally, the storage subsystem may comprise any device, e.g., a host, computer, etc, that uses an adaptor to configure an attached storage device.

In the described implementations, the disk drives 8a, b, c . . . n comprised magnetic hard disk drives. In alternative implementations, the storage device 4 may comprise any storage device known in the art, such as optical disks, tapes, etc.

In the described implementations, the initialization data comprised zero data. Additionally, the initialization data may comprise other data values than zero data.

In the described implementations, the error correction code written to the sector comprises a longitudinal redundancy check (LRC) code generated by performing an exclusively OR operation with respect to the data in the sector and the LBA of the sector. Additionally, the error correction code may be generated using any error correction coding technique known in the art, and is not limited to the LRC technique described herein.

The storage controller may comprise any processor, system, or adaptor capable of configuring and utilizing one or more disk drives.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for initializing a storage device comprising multiple storage units through a storage controller, comprising:

receiving a request to initialize a storage space that spans the storage units;
   determining a layout of sets of sequential data blocks of the storage space onto the storage units, wherein sets of sequential data blocks are written across the storage units;
   for each set of sequential data blocks, performing:
   (i) determining a block address in each storage unit where a first data block in the set of sequential data blocks will be written;
   (ii) generating a write command for each of the storage units, wherein each write command indicates the determined block address for the storage unit and a block number; and
   (iii) transmitting the write command with one block of initialization data to the storage unit, wherein the storage unit receiving the write command writes the block of initialization data from the indicated block address and writes the block of initialization data to each subsequent consecutive block in the storage unit a number of times equal to the block number.

2. The method of claim 1, wherein the determined layout includes multiple sets of sequential data blocks written to each storage unit, wherein the sequential data blocks of each set written to one storage unit are non-consecutive with respect to the sequential data blocks in adjacent sets written to the storage unit.

3. The method of claim 1, wherein the initialization data comprises zero data for the block.

4. The method of claim 1, wherein the storage units comprise hard disk drives within a disk array, and wherein the sets of sequential data blocks comprise portions of a stripe of data written across the storage units, wherein multiple stripes are written across the storage units.

5. The method of claim 1, further comprising:
   indicating in the write command a code to cause the storage unit receiving the write command to write an error correction code to each block to which the initialization data is written.

6. The method of claim 5, wherein the code indicated in the write command further causes the storage unit receiving the write command to performing:
   combining the block address of the block to which the error correction code is written with the error correction code.

7. The method of claim 5, wherein the error correction code written by the storage unit comprises a longitudinal redundancy check (LRC) code computed by performing an exclusive OR operation with respect to all the data in the block to which the error correction code is written.

8. The method of claim 1, wherein the data block comprises a sector including at least a header section, a user data section, and an error correction code section.

9. The method of claim 1, further comprising:
   determining for each set of sequential data blocks a sequence number in each storage unit where a first data block in the set of sequential data blocks will be written, wherein each data block in the storage space is assigned a sequential number indicating a location in the storage space relative to all other data blocks; and
   indicating in the write command the determined sequence number to cause the storage unit to write the sequence number of the data block in the storage space to each data block to which initialization data is written.

10. A method for initializing a storage unit that comprises one of multiple storage units managed by a storage controller, comprising:
   receiving a write command with one block of initialization data from the storage controller to initialize a set of sequential blocks in a storage space, wherein the write command indicates a block address in the storage unit where a first data block in the set of sequential data blocks will be written and a block number;
   writing the block of initialization data transmitted with the write command to the indicated block address; and
   writing the block of initialization data to each subsequent consecutive block in the storage unit following the indicated block address a number of times equal to the block number.

11. The method of claim 10, wherein each storage unit receives multiple write commands to initialize multiple sets of sequential data blocks in the storage unit, wherein the sequential data blocks of each set written to one storage unit are non-consecutive with respect to the sequential data blocks in adjacent sets written to the storage unit.

12. The method of claim 10, wherein the storage units comprise hard disk drives within a disk array, and wherein the sets of sequential data blocks comprise portions of a stripe of data written across the storage units in the disk array, wherein multiple stripes are written across the storage units.

13. The method of claim 10, further comprising:

writing an error correction code to each block to which the initialization data is written.

14. The method of claim 13, wherein writing the error correction code further comprises:

combining the block address of the block to which the error correction code is written with the error correction code.

15. The method of claim 10, wherein the data block comprises a sector including at least a header section, a user data section, and an error correction code section.

16. A system for initializing a storage device comprising multiple storage units, comprising:

means for receiving a request to initialize a storage space that spans the storage units;

means for determining a layout of sets of sequential data blocks of the storage space onto the storage units, wherein sets of sequential data blocks are written across the storage units; and means for performing, for each set of sequential data blocks:

(i) determining a block address in each storage unit where a first data block in the set of sequential data blocks will be written;

(ii) generating a write command for each of the storage units, wherein each write command indicates the determined block address for the storage unit and a block number; and (iii) transmitting the write command with one block of initialization data to the storage unit, wherein the storage unit receiving the write command writes the block of initialization data from the indicated block address and writes the block of initialization data to each subsequent consecutive block in the storage unit a number of times equal to the block number.

17. The system of claim 16, wherein the determined layout includes multiple sets of sequential data blocks written to each storage unit, wherein the sequential data blocks of each set written to one storage unit are non-consecutive with respect to the sequential data blocks in adjacent sets written to the storage unit.

18. The system of claim 16, wherein the initialization data comprises zero data for the block.

19. The system of claim 16, wherein the storage units comprise hard disk drives within a disk array, and wherein the sets of sequential data blocks comprise portions of a stripe of data written across the storage units, wherein multiple stripes are written across the storage units.

20. The system of claim 16, further comprising:

means for indicating in the write command a code to cause the storage unit receiving the write command to write an error correction code to each block to which the initialization data is written.

21. The system of claim 20, wherein the code indicated in the write command further causes the storage unit receiving the write command to combine the block address of the block to which the error correction code is written with the error correction code.

22. The system of claim 20, wherein the error correction code written by the storage unit comprises a longitudinal redundancy check (LRC) code computed by performing an exclusive OR operation with respect to all the data in the block to which the error correction code is written.

23. The system of claim 16, wherein the data block comprises a sector including at least a header section, a user data section, and an error correction code section.

24. The system of claim 16, further comprising:

means for determining for each set of sequential data blocks a sequence number in each storage unit where a first data block in the set of sequential data blocks will be written, wherein each data block in the storage space is assigned a sequential number indicating a location in the storage space relative to all other data blocks; and means for indicating in the write command the determined sequence number to cause the storage unit to write the sequence number of the data block in the storage space to each data block to which initialization data is written.

25. A system for initializing data in response to a command transmitted by a storage controller, comprising:

a storage unit;

means for receiving a write command with one block of initialization data from the storage controller to initialize a set of sequential blocks in a storage space, wherein the write command indicates a block address in the storage unit where a first data block in the set of sequential data blocks will be written and a block number;

means for writing the block of initialization data transmitted with the write command to the indicated block address in the storage unit; and means for writing the block of initialization data to each subsequent consecutive block in the storage unit following the indicated block address a number of times equal to the block number.

26. The system of claim 25, further comprising:

means for receiving multiple write commands to initialize multiple sets of sequential data blocks in the storage unit, wherein the sequential data blocks of each set written to one storage unit are non-consecutive with respect to the sequential data blocks in adjacent sets written to the storage unit.

27. The system of claim 25, further comprising:

a disk array including multiple storage units, wherein the storage units comprise hard disk drives within a disk array, and wherein the sets of sequential data blocks comprise portions of a stripe of data written across the storage units in the disk array, wherein multiple stripes are written across the storage units.

28. The system of claim 25, further comprising:

means for writing an error correction code to each block to which the initialization data is written.

29. The system of claim 28, wherein the means for writing the error correction code further performs:

combining the block address of the block to which the error correction code is written with the error correction code.

30. The system of claim 25, wherein the data block comprises a sector including at least a header section, a user data section, and an error correction code section.

31. An article of manufacture comprising code executed by a storage controller for initializing a storage device comprising multiple storage units by:
    receiving a request to initialize a storage space that spans the storage units;
    determining a layout of sets of sequential data blocks of the storage space onto the storage units, wherein sets of sequential data blocks are written across the storage units;
    for each set of sequential data blocks, performing:
        (i) determining a block address in each storage unit where a first data block in the set of sequential data blocks will be written;
        (ii) generating a write command for each of the storage units, wherein each write command indicates the determined block address for the storage unit and a block number; and
        (iii) transmitting the write command with one block of initialization data to the storage unit, wherein the storage unit receiving the write command writes the block of initialization data from the indicated block address and writes the block of initialization data to each subsequent consecutive block in the storage unit a number of times equal to the block number.

32. The article of manufacture of claim 31, wherein the determined layout includes multiple sets of sequential data blocks written to each storage unit, wherein the sequential data blocks of each set written to one storage unit are non-consecutive with respect to the sequential data blocks in adjacent sets written to the storage unit.

33. The article of manufacture of claim 31, wherein the initialization data comprises zero data for the block.

34. The article of manufacture of claim 31, wherein the storage units comprise hard disk drives within a disk array, and wherein the sets of sequential data blocks comprise portions of a stripe of data written across the storage units, wherein multiple stripes are written across the storage units.

35. The article of manufacture of claim 31, wherein the code further causes the storage controller to perform:
    indicating in the write command a code to cause the storage unit receiving the write command to write an error correction code to each block to which the initialization data is written.

36. The article of manufacture of claim 35, wherein the code indicated in the write command further causes the storage unit receiving the write command to perform:
    combining the block address of the block to which the error correction code is written with the error correction code.

37. The article of manufacture of claim 35, wherein the error correction code written by the storage unit comprises a longitudinal redundancy check (LRC) code computed by performing an exclusive OR operation with respect to all the data in the block to which the error correction code is written.

38. The article of manufacture of claim 31, wherein the data block comprises a sector including at least a header section, a user data section, and an error correction code section.

39. The article of manufacture of claim 31, wherein the code further causes the storage controller to perform:
    determining for each set of sequential data blocks a sequence number in each storage unit where a first data block in the set of sequential data blocks will be written, wherein each data block in the storage space is assigned a sequential number indicating a location in the storage space relative to all other data blocks; and
    indicating in the write command the determined sequence number to cause the storage unit to write the sequence number of the data block in the storage space to each data block to which initialization data is written.

40. An article of manufacture including code executed by a storage unit for initializing the storage unit executing the code, wherein the storage unit is one of multiple storage units managed by a storage controller, wherein the code causes the storage unit to perform:
    receiving a write command with one block of initialization data from the storage controller to initialize a set of sequential blocks in a storage space, wherein the write command indicates a block address in the storage unit where a first data block in the set of sequential data blocks will be written and a block number;
    writing the block of initialization data transmitted with the write command to the indicated block address; and
    writing the block of initialization data to each subsequent consecutive block in the storage unit following the indicated block address a number of times equal to the block number.

41. The article of manufacture of claim 40, wherein each storage unit receives multiple write commands to initialize multiple sets of sequential data blocks in the storage unit, wherein the sequential data blocks of each set written to one storage unit are non-consecutive with respect to the sequential data blocks in adjacent sets written to the storage unit.

42. The article of manufacture of claim 40, wherein the storage unit comprises a hard disk drive within a disk array, and wherein the sets of sequential data blocks comprise portions of a stripe of data written across the storage units in the disk array, wherein multiple stripes are written across the storage units.

43. The article of manufacture of claim 40, wherein the code further causes the storage unit to perform:
    writing an error correction code to each block to which the initialization data is written.

44. The article of manufacture of claim 43, wherein writing the error correction code further comprises:
    combining the block address of the block to which the error correction code is written with the error correction code.

45. The article of manufacture of claim 40, wherein the data block comprises a sector including at least a header section, a user data section, and an error correction code section.

46. A computer readable medium including a command used for initializing a storage unit that comprises one of multiple storage units managed by a storage controller, wherein the command is associated with the following data:
    one block of initialization data used to initialize a set of sequential blocks in a storage space;
    a block address in the storage unit where a first data block in the set of sequential data blocks will be written; and
    a block number, wherein the command causes the storage unit to write the block of initialization data to the indicated block address and to each subsequent consecutive block in the storage unit following the indicated block address a number of times equal to the block number.

47. The computer readable medium of claim 46, wherein the storage units comprise a hard disk drive within a disk array, and wherein the sets of sequential data blocks comprise portions of a stripe of data written across the storage units in the array, wherein multiple stripes are written across the storage units.

48. The computer readable medium of claim 46, wherein the command further includes:
   data indicating whether to write an error correction code to each block to which the initialization data is written.

49. The computer readable medium of claim 46, wherein the data blocks that are initialized each comprise a sector including at least a header section, a user data section, and an error correction code section.

50. The computer readable medium of claim 46, wherein the initialization data comprises zero data for the block.

51. The computer readable medium of claim 46, further comprising:
   a determined sequence number, wherein each data block in the storage space is assigned a sequential number indicating a location in the storage space relative to all other data blocks.

* * * * *